ELECTRIC CIRCUIT CONTROLLING DEVICE

Filed Nov. 14, 1957 4 Sheets-Sheet 1

Inventors
Joseph DiGirolamo
Wilbert H. Budd
By Ira Milton Jones
Attorney

ELECTRIC CIRCUIT CONTROLLING DEVICE

Filed Nov. 14, 1957 4 Sheets-Sheet 2

Inventors
Joseph Di Girolamo
Wilbert H. Budd
By [signature]
Attorney

Inventors
Joseph DiGirolamo
Wilbert H. Budd
By Ira Milton Jones
Attorney

July 19, 1960 J. DI GIROLAMO ET AL 2,945,933

ELECTRIC CIRCUIT CONTROLLING DEVICE

Filed Nov. 14, 1957 4 Sheets-Sheet 4

Inventors
Joseph Di Girolamo
Wilbert H. Budd
By Ira Milton Jones
Attorney

United States Patent Office 2,945,933

Patented July 19, 1960

2,945,933

ELECTRIC CIRCUIT CONTROLLING DEVICE

Joseph Di Girolamo, Mishawaka, and Wilbert H. Budd, Elkhart, Ind., assignors to CTS Corporation, Elkhart, Ind., a corporation of Indiana Filed Nov. 14, 1957, Ser. No. 696,376

13 Claims. (Cl. 200—122)

This invention relates to electric circuit controlling devices and has as its primary object the provision of a circuit controlling device useful in various electrical appliances such as radio and television receivers for prolonging the life of the thermionic tubes thereof.

Heretofore the useful life of the thermionic tubes of radio and television receivers has been quite limited, due primarily to the harmful effects of high power surges on the tube filaments when the receiver was turned on and also what is termed the cathode stripping action which results from the application of high D.C. or B plus voltages to the anodes of the tubes before their cathodes were fully heated.

It is the purpose of this invention, therefore, to provide an electric circuit controlling device for incorporation in radio and television receivers to assure preheating of the tube filaments and cathodes for a predetermined period of time before plate voltage is applied to the anodes of the tubes.

More specifically it is the purpose of this invention to provide an electric circuit controlling device for incorporation in such electrical appliances as radio and television receivers, which device incorporates a normally open thermal switch adapted to be connected between the tube anodes and the B plus source of the receiver, along with a resistance element adapted to be connected in one of the two power supply conductors leading to the receiver to serve as a heater for effecting closure of the thermal switch in time delay relation to the initial flow of current in the resistance element.

Assuming that the receiver is provided with a conventional transformer power supply system having a primary and having a secondary for heating the tube filaments, the resistance element of the device of this invention may be connected in series with the primary of the transformer to protect the filaments of the receiver tubes from the initial high power surges resulting from turning the receiver on. In this connection it is a further purpose of this invention to provide a circuit controlling device of the character described which features a resistance element having a negative temperature coefficient of resistance whereby the resistance in the primary circuit of the transformer will be initially high to retard current flow in the filament circuits of the receiver tubes but will gradually decrease as the temperature of the resistance element rises so as to assure gradual heating of the tube filaments and cathodes to the desired degree before effecting closure of the thermal switch in response to the heat generated by the resistance element.

Other objects of this invention are to provide an electric circuit controlling device of the character described which is highly efficient, small and compact, and easily adjustable to vary the time delay interval during which the tube filaments and cathodes are gradually heated while the tube anodes are disconnected from the B plus source.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Figures 1, 4:
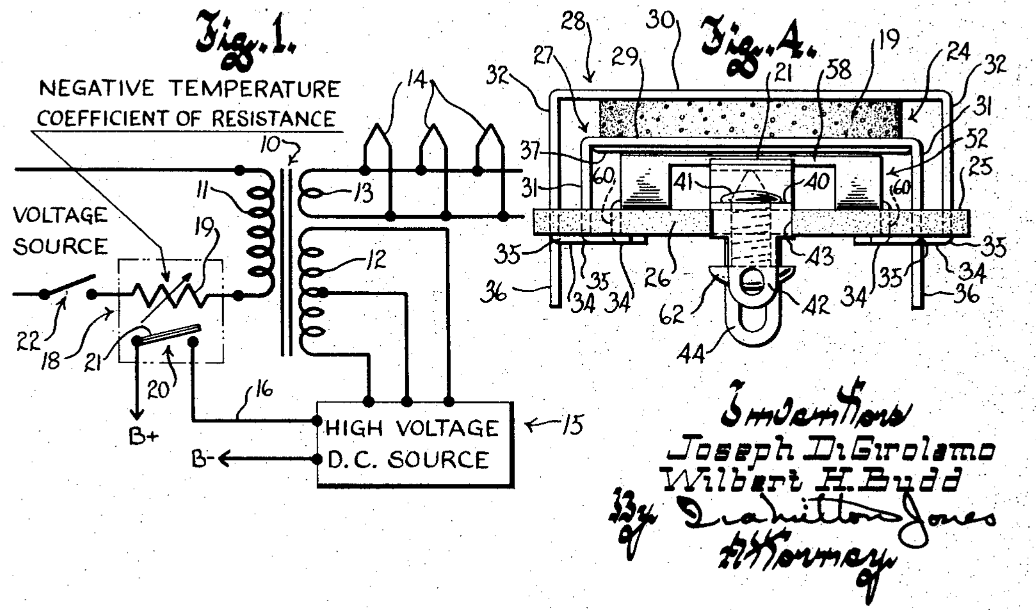
Figure 1 is an electrical diagram illustrating one application of the electric circuit controlling device of this invention to the power supply means of a radio or television receiver.
Figure 4 is a rear elevational view of the device shown in Figure 3.
Figure 1A:
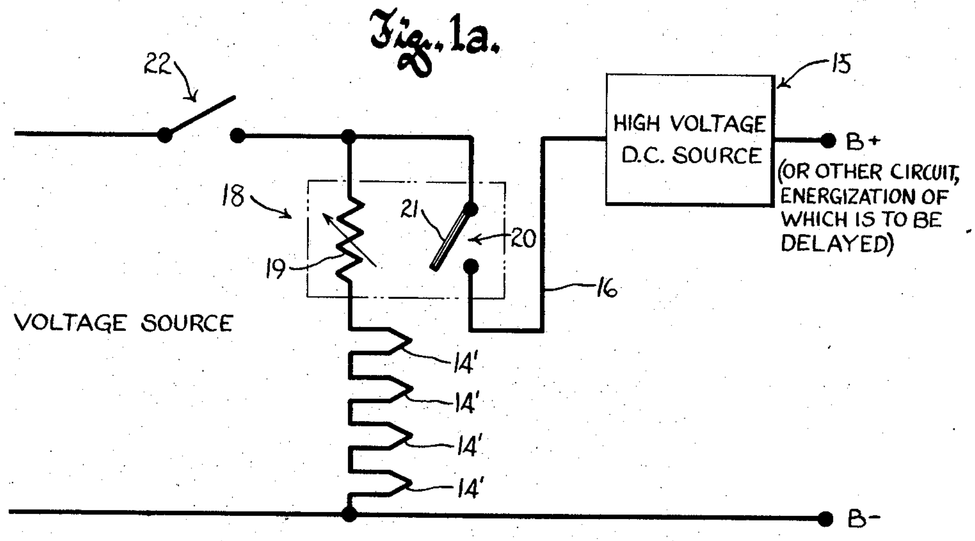
Figure 1A (on Sheet 2) is a diagram illustrating the application of the circuit controlling device of this invention to another type of power supply.

Referring now more particularly to the accompanying drawings in which like reference characters have been applied to like parts throughout the several views, the purpose of the electric circuit controlling device of this invention will be best appreciated from a consideration of the wiring diagrams shown in Figures 1 and 1A, the latter appearing on sheet 2 of the drawings. In Figure 1, the numeral 10 designates the power transformer of a radio or television receiver. The transformer has the usual primary winding 11, a high voltage secondary 12, and a low voltage secondary 13 providing a source of E.M.F. for heating the filaments 14 of all of the electron tubes of the receiver. As is customary in this type of power supply, the filaments 14 are connected in parallel across the ends of the low voltage secondary 13 of the transformer.

The end and center taps of the high voltage secondary 12 of the transformer lead to a rectification and filtering unit generally designated 15 having an output conductor 16 which is connectible with the anodes of the electron tubes of the receiver, and is customarily referred to as a source of B plus voltage.

The power supply circuit illustrated in Figure 1A is of the "series string" type wherein the filaments 14 of the tubes are connected in series across the voltage source; but in other respects it is similar to that of Figure 1.

The electric circuit controlling device 18 of this invention comprises a resistance element 19 which is adapted to be connected in series with the primary 11 of the power transformer, as in Figure 1 or in series with the filaments 14' as in Figure 1A; and a thermal switch 20 which is adapted to be connected between the anodes of the electron tubes and the B plus source 16 as in Figure 1, or in the input to the source 16 as in Figure 1A, to in each instance control the application of high voltage D.C. to the tube anodes. The switch 20 is of the normally open type and it has a heat sensitive actuator in the form of a bimetallic blade 21 positioned adjacent to the resistance element 19 so as to be heated thereby whenever the receiver is turned on by closure of its "on-off" line switch 22. When the heat sensitive actuator 21 of the thermal switch has been heated by the resistance element to a predetermined value, the differential flexure thereof which accompanies such heating effects closure of the switch and connection of the anodes of the electron tubes with the B plus source.

Obviously, of course, the device can be also used to delay energization of any circuit for a predetermined interval after closure of a first circuit.

It is a feature of the electrical circuit controlling device of this invention that the resistance element 19 is of the type which has a negative temperature coefficient of resistance, such resistors being known as "thermistors." Consequently, the resistance in the circuit in which the element 19 is connected will be initially high to retard the current flowing in the filaments of the tubes, whether they are supplied by the secondary 13 of the transformer as in Figure 1 or directly from the voltage source as in Figure 1A. However, as the resistance element 19 heats up due to current flow therein, its resistance will gradually diminish to a negligible value so that when it is fully heated it may be considered as having no effect upon the circuit in which it is connected.

Merely by way of example, actuation of the thermal switch 20 in response to the heat of the resistance element 19 may be delayed for about 40 seconds following closure of the line switch 22. During this time delay period an energizing current is gradually applied to the filaments of the electron tubes of the receiver, and the cathodes of the tubes are gradually heated to the desired temperature before the thermal switch 20 is closed and B plus voltage is applied to the anodes of the tubes. This assures protection of the tube filaments from initial high power surges and the tube cathodes from the stripping action which has heretofore resulted in limited tube life.

With the incorporation of an electric circuit controlling device of this invention in a radio or television receiver in the manner described, the life of the receiver tubes may be prolonged by as much as two to three times their ordinary life span.

Figure 2:
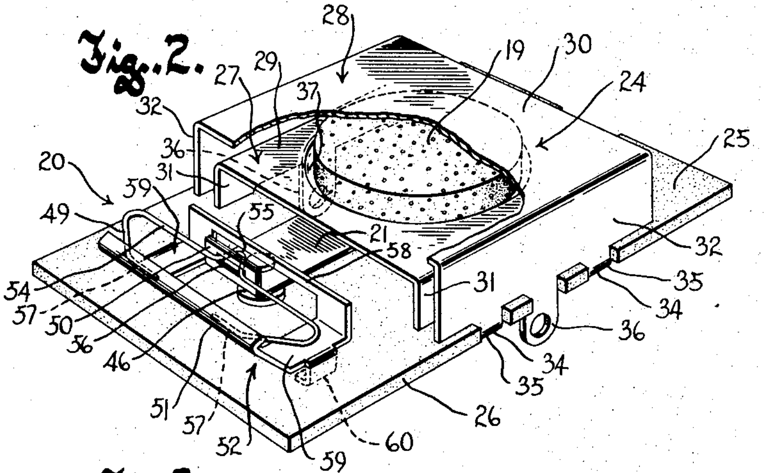
Figure 2 is a perspective view of an electric circuit controlling device embodying this invention, portions thereof being broken away and shown in section.
Figure 3:
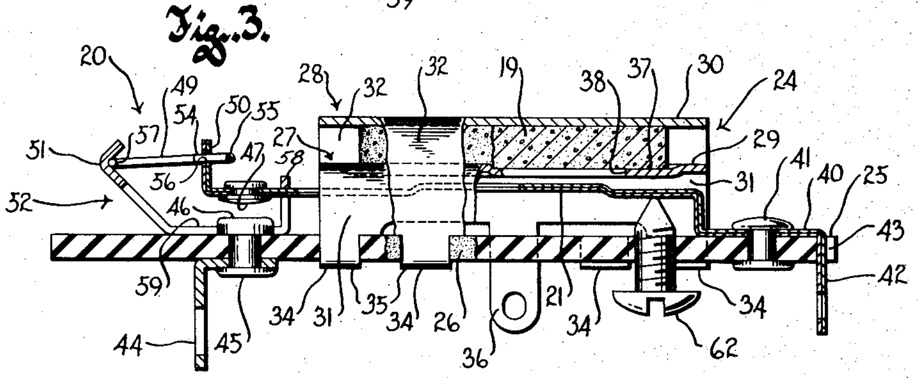
Figure 3 is a view partly in side elevation and partly in longitudinal section, of the device shown in Figure 2.

In practice, the resistance element 19 and the thermal switch 20 may be satisfactorily embodied in a small and compact surge limiting device in any of several ways. One embodiment of the device of this invention, which features simplicity of construction and a minimum of piece parts is illustrated in Figures 2, 3 and 4. As therein shown, the resistance element 19 is a solid flat disc, forming part of a heater assembly 24, and both the heater assembly and the thermal switch 20 are mounted on the upper face 25 of a flat rectangular base 26 of insulating material. The resistance disc 19, as already pointed out, is a thermistor so that it has a negative temperature coefficient of resistance, which may be on the order of about 100 ohms when cold and negligible when the element is fully heated.

The heater assembly 24 also includes inner and outer terminal members 27 and 28 for connecting the resistance element in circuit, and also to rigidly mount the resistance element on the base. For that purpose, the terminal members are formed as nesting channel shaped sheet metal stampings having their webs extending transversely across the base and providing substantially flat lower and upper body portions 29 and 30, respectively, between which the resistance element or disc 19 is flatwise confined.

The inner terminal member 27 has downwardly projecting parallel flanges 31 which abut the upper face of the base and hold the body portion 29 of the terminal member in spaced parallel relation to the base, and these flanges are spaced inwardly from similar flanges 32 on the outer terminal member 28. The width of the flanges 32 on the outer terminal member exceeds that of the flanges 31 on the inner terminal member by an amount not greater than the thickness of the disc 19, and they abut the upper face of the base along its opposite longitudinal edges to thus hold the body portion 30 of the outer terminal member in spaced parallel relation to the body portion 29 of the inner terminal member.

Pairs of tangs 34 on each of the flanges 31 and 32 passing through suitable openings in the base and bent over against the underside of the base as at 35 serve to rigidly secure the terminal members to the base with the resistance disc 19 tightly clamped between their body portions. To insure good electrical connections between the terminal members and the resistance element, the web of the outer terminal member which provides the body portion 30 is preferably bowed inwardly a slight amount before assembly.

Tongues 36 projecting downwardly from one flange of each terminal member and likewise passing through suitable openings in the base provide terminals accessible at the underside of the base for connecting the resistance element in its circuit.

If desired, the body portion 29 of the inner terminal member may have a circular depression 37 formed in its central part of a size to receive the resistance disc 19 and hold the same against shifting relative to the terminal members, and the depressed portion is cut out as at 38 to directly expose the underside of the resistance disc to the space beneath it.

The bimetallic blade 21 of the thermal switch 20 substantially flatwise overlies the upper face of the base and extends lengthwise thereof entirely through the space beneath the channel shaped lower terminal member 27 so as to be straddled thereby. Accordingly, the blade 21 is in close juxtaposition to the exposed underside of the resistance disc, and to assure maximum heat transfer from the disc to the blade and still maintain adequate electrical clearance between the blade and the rest of the structure, the medial portion of the blade is stepped as at 23 to bring the same closer to the disc.

The blade is relatively thin and flexible and has a stepped rear end portion providing a foot 40 which lies flatwise against the base. A rivet 41 passing through the foot and the base serves to secure the blade to the base with the major or free length of the blade spaced above the base and adjacent to the underside of the heater assembly to be heated thereby. Rotational movement of the blade about the axis of its rivet 41 is prevented by a tongue 42 bent downwardly from the foot 40 and passing through a notch 43 in the adjacent end of the base. The tongue 42 serves as one of the switch terminals, and like the terminals 36 for the resistance disc, it is also accessible from the underside of the base. The other terminal 44 of the switch is secured to the underside of the base by a rivet 45 having a head 46 which provides a stationary contact of the switch. The stationary contact is disposed at the upper face of the base directly beneath the forward or free end of the blade 21 so as to be cooperable with a movable contact 47 thereon.

In its normal or switch open position, the bimetallic blade holds the movable contact on its free end spaced above the stationary contact, but when heated by the resistance disc 19, the free end portion of the blade flexes downwardly to carry the movable contact 47 thereon toward engagement with the stationary contact. Closure of the thermal switch, of course, is effected upon heating of the bimetallic blade to a predetermined value. The bimetallic blade thus constitutes a bridging member to electrically bridge the switch terminals 42 and 44 when the blade is flexed to engage its contactor 47 with the contact 46, the fixed end or foot 40 of the blade being considered a contact portion for the terminal 42.

If desired, an overcenter compression spring 49 may be connected with the free end portion of the switch blade to effect snap actuation thereof between its switch open and switch closed positions. The overcenter spring is formed of wire and is confined under compression between a leg 50 bent up from the free end of the blade 21, and an arm 51 on a spring seat member 52 secured to the base adjacent to the stationary switch contact. The spring has an elongated resilient body portion 54 which is substantially straight and extends crosswise of the base and parallel thereto, in engagement with the front of the leg 50 on the switch blade. Medially of its ends, the body portion 54 has a kink providing a rearwardly extending tongue 55 thereon which is loosely received in a slit 56 in the leg 50 to operatively connect the spring thereto and prevent detachment of the spring therefrom.

The opposite ends of the body portion 54 of the spring are bent forwardly and inwardly toward one another to terminate in transversely aligned legs 57 which are substantially parallel to the body portion 54 and are pivotally received in a rearwardly opening V-shaped crease in the arm 51 of the spring seat member. The crease, of course, provides a fulcrum to pivotally support the spring for rocking motion about a transverse axis spaced forwardly of the free end of the switch blade and parallel to the base.

As shown in Figure 3, all portions of the spring lie in a plane which diverges rearwardly at a slight angle to the base, so that the spring exerts an upward force on the bimetallic blade to yieldingly hold the switch open. A bridge bar 58 integrally connected with the spring seat member extends crosswise over the bimetallic blade at a location just behind the movable contact thereon, to limit upward flexure of the blade under the force of the overcenter spring. The bar thus serves three purposes. It defines the switch open position of the blade, establishes the electrical clearance between the blade and the web 29 of the inner terminal member, and it establishes the normal position of the blade with respect to the heater disc 19.

As seen best in Figure 2, the spring seat member is formed as a single sheet metal stamping having a substantially large central opening therein providing transversely spaced longitudinally extending base portions 59 flatwise secured to the top of the base by integral tangs 60 passing through suitable slits in the base, the tangs being bent up against the underside of the base. At their rear, the base portions are bent upwardly, at locations outwardly of the opposite side edges of the bimetallic blade, to be integrally joined together by the bridge bar 58. At their front, the base portions are bent forwardly and upwardly to be integrally joined with the transversely extending creased arm 51 on the spring seat member.

The operation of the overcenter spring 49 will be readily understood from the drawings. Hence, it will suffice to note that it yieldingly resists downward flexure of the bimetallic blade in response to heating thereof by the resistance disc 19, and it is caused to rock on its fulcrum during such flexure of the blade until its point of connection therewith passes through a dead center position at which the spring is under maximum compressive force. As soon as the dead center position is passed, the spring suddenly expands and snaps the free end portion of the blade downwardly to engage its contact 47 with the stationary contact, thus quickly effecting closure of the switch. The switch is opened, of course, with a similar snap action as the blade cools.

If desired, means may also be provided to enable the time interval required for closure of the thermal switch to be varied. For that purpose, an adjusting screw 62 is threaded into the base from its underside, to have its extremity cooperate with the underside of the bimetallic blade 21 near the step at its fixed end. Engagement of the screw with the blade establishes its effective length, and upward adjustment thereof increases the time interval required for closure of the thermal switch. The adjusting screw also enables setting of the switch mechanism to render it highly sensitive to cooling of the bimetallic blade, thus enabling the overcenter spring to snap the switch open upon even the slightest cooling of the blade.

Figures 5, 6, 7:
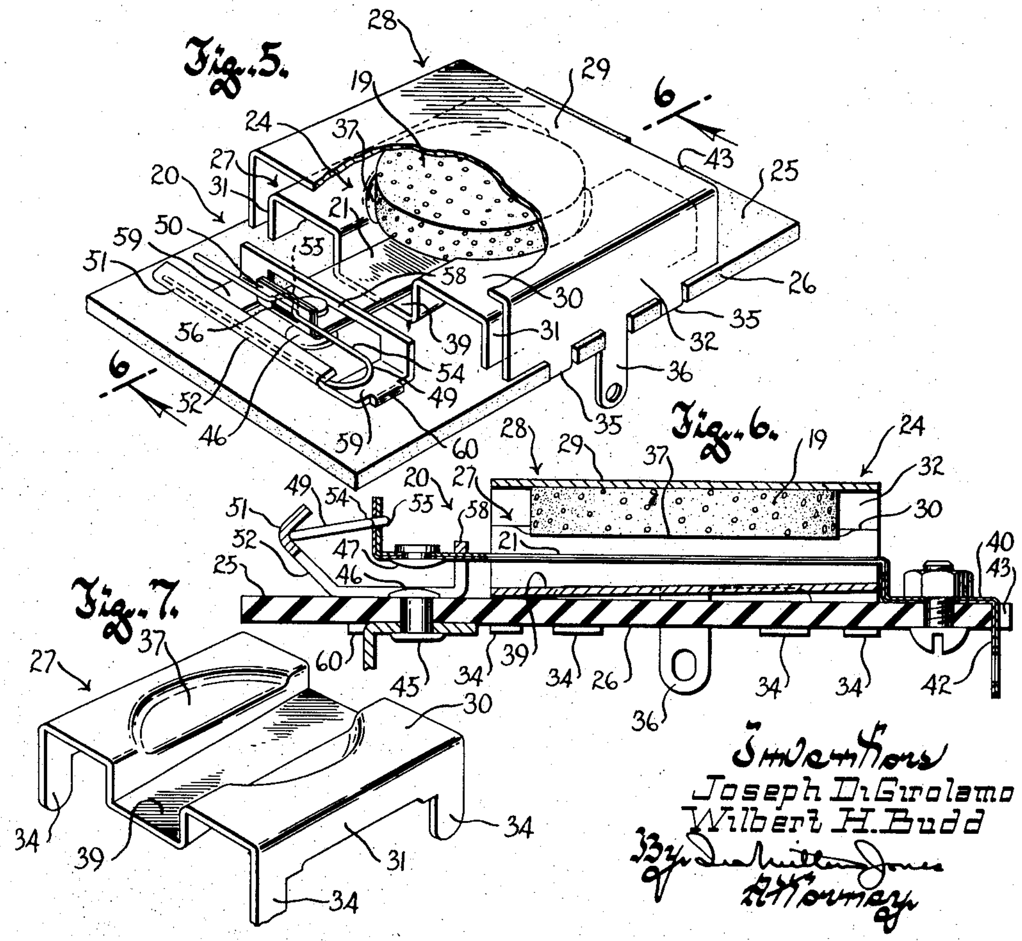
Figure 5 is a view similar to Figure 2, but illustrating a modified embodiment of this form of the invention.
Figure 6 is a cross sectional view through Figure 5 on the plane of the line 6—6.
Figure 7 is a detail perspective view of one of the parts of the structure shown in Figure 5.

In that form of the invention illustrated in Figures 5, 6 and 7, the general organization or design of the mechanism is very similar to that just described, and hence to a large degree common reference numerals appear on Figures 2 to 7 inclusive. The chief difference between these two embodiments of the invention resides in the fact that in the device of Figures 5, 6 and 7 the web of the inner terminal member 27 has its central portion stepped downward as at 39 to embrace and underlie the bimetal blade. This exposes the underside of the resistance disc 19 and also provides a heat reflector to reflect the heat emanating from the resistance disc upwardly against the bimetallic blade. A more rapid response is thus possible.

Figure 8:
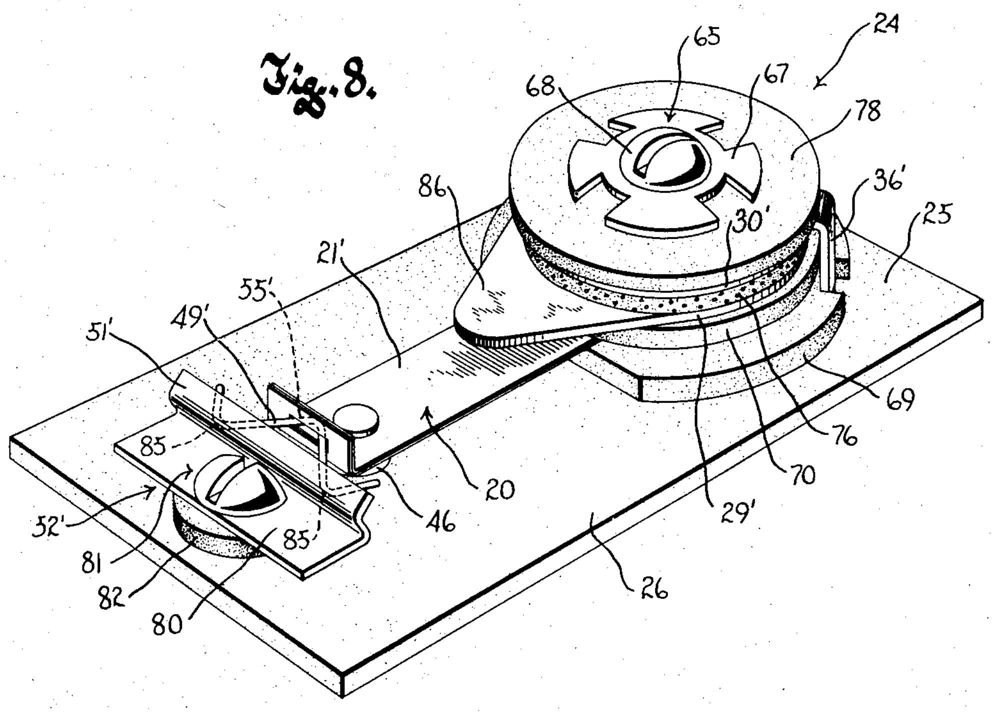
Figure 8 is a perspective view of another modified form of the control device.
Figure 9:
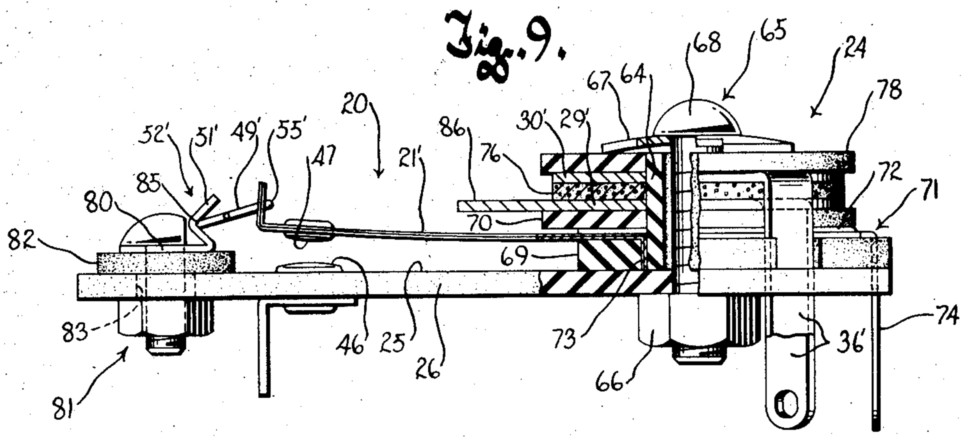
Figure 9 is a view partly in side elevation and partly in longitudinal section of the control device shown in Figure 8.

Figures 8 and 9 illustrate another embodiment of the invention in which the heater assembly 24 and the thermal switch 20 are again mounted on the upper face of a flat rectangular base 26 of insulating material, but with the heater assembly adjacent to the rear end of the base and thus remote from the cooperating stationary and movable contacts 46 and 47, respectively, of the thermal switch.

In this case, however, the heater assembly is mounted on a hollow post 64, of insulating material, seated endwise on and projecting upwardly from the base, and having a bolt 65 passing downwardly therethrough and through a suitable hole in the base. A nut 66 is threaded on the lower end of the bolt to bear against the underside of the base, and a spring washer 67 is interposed between the head 68 of the bolt and the top of the heater assembly to firmly clamp the assembly to the base when the nut 66 is tightened.

The heater assembly comprises a pair of insulating washers 69 and 70 disposed in axially adjacent relation on the lower end of the insulating post. A switch terminal member 71 with a substantially flat body portion 72 encircling the post, and the rear end portion of the bimetallic blade 21′ is clamped between the washers 69 and 70 with the body portion of the terminal member in good electrical engagement with the rear end of the bimetallic blade. At its rear extremity the bimetallic blade has a lip 73 bent downwardly therefrom and received in a notch opening to the aperture in the lower insulating washer 69 so as to be confined between the washer and the post to preclude accidental displacement of the bimetallic blade out of its desired position. The terminal member 71 has also a terminal portion 74 bent downwardly from the rear portion thereof and passing through a notch (not shown) in the rear portions of the washer 69 and the base to preclude rotation of the lower insulating washer 69 and the terminal member about the axis of the insulating post 64. The terminal portion 74, of course is accessible at the underside of the base.

The resistance element 76 as well as the body portions 29′ and 30′ of its terminal members have centrally disposed apertures therein to receive the insulating post, and these members are seated upon the upper insulating washer 70 and held tightly thereagainst by the bolt 65. Confined between the body portion 30′ of the upper terminal member and the spring washer 67, however, is another insulating washer 78, which serves to insulate the resistance element and its terminals from the bolt by which the heating assembly is secured to the base.

Formed integrally with the two terminal members for the resistance element and projecting downwardly therefrom are terminal portions 36', one connected to the periphery of the body portion of each terminal member. The terminals 36' extend downwardly through suitable notches in the peripheral portion of the lowermost insulating washer 69 and through suitable slits in the base 26 to have their lower ends accessible at the underside of the base for connection of the resistance element in the primary circuit of the power transformer. The terminals 36' thus also preclude rotation of the terminal members for the resistance element from rotation about the axis of the bolt 65.

The bimetallic switch 20 is substantially the same as in the previous embodiments of the invention except for the manner in which the rear end of the blade is fixedly mounted with respect to the base, and except for the provision of a slightly different form of spring seat member 52' for the overcenter spring 49'.

In this case the spring seat member is a sheet metal clip having a flat base 80 which is secured to the forward end portion of the base 26 by a bolt and nut connection 81, with a block of insulating material 82 interposed between the insulating base and the head of the bolt to hold the spring seat member at a slight elevation above the base. The hole 83 in the base through which the shank of the bolt passes is elongated longitudinally of the base so as to provide for a degree of adjustment of the spring seat member toward and from the free end of the bimetallic blade, to thereby enable the compression of the overcenter spring 49' to be adjusted as desired. The spring seat member, of course, also includes a transversely extending arm 51' having a rearwardly opening V-shaped crease therein to provide a fulcrum for the forward end portion of the overcenter spring.

The spring 49' is slightly different in this case in that it has a substantially W-shaped outline as viewed in Figure 8. The center point of the W-shaped spring provides a tongue 55' which is engaged in the slit formed in the upstanding leg on the end of the bimetallic blade to operatively connect the spring thereto and to prevent its detachment from the blade. The two remaining points 85 of the W are engaged in the bottom of the V-shaped crease of the spring seat member to be fulcrumed thereby for rocking motion about a transverse axis parallel to the base and spaced a distance thereabove. All portions of the W-shaped spring, of course, lie in a common plane.

The operation of the electric circuit controlling device described in Figures 8 and 9 is the same as that described previously, but inasmuch as the bimetallic blade 21 has its rear portion separated from the resistance element 76 by the insulating washer 70, good heat transfer between the resistance element and the blade is assured by the provision of a lobe 86 on the body portion 29' of the lower terminal for the resistance element, which lobe extends forwardly beyond the periphery of the washer 70 and over a substantial portion of the bimetallic blade as seen best in Figure 6.

With the control device of Figures 8 and 9, it will be appreciated that the time delay interval between initial energization of the primary of the power transformer and closure of the thermal switch will be determined by the setting of the spring seat member 52'. The time delay period can be increased by adjusting the spring seat member to a position closer to the free end of the bimetallic blade to place greater compressive force upon the overcenter spring 49', or it can be decreased by adjustment of the spring seat member to a position farther away from the free end of the bimetallic blade.

Figure 10:
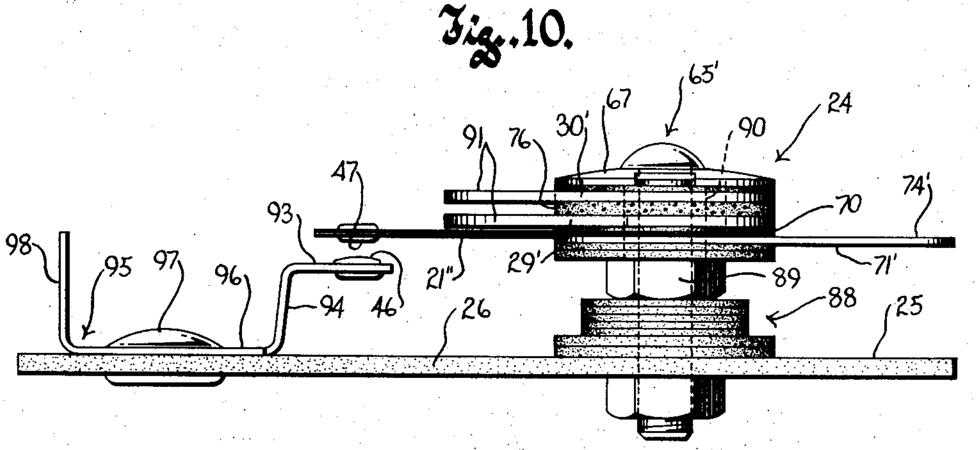
Figure 10 is a side elevational view of still another form of control device embodying the principles of this invention.
Figure 11:
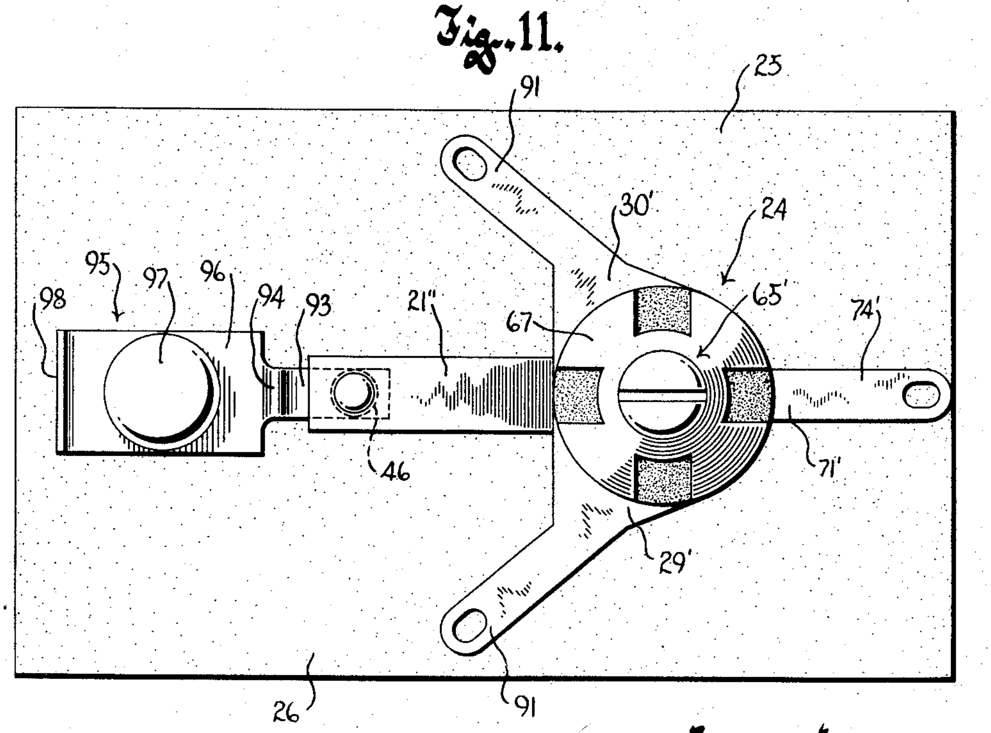
Figure 11 is a plan view of the control device shown in Figure 10.

In the embodiment of the invention illustrated in Figures 10 and 11, the heater assembly 24 is again mounted on the rear portion of the insulating base 26 by means of a bolt 65', but with the assembly at a higher elevation than was the case previously. For this purpose a stack 88 of insulating washers serves as spacing means disposed on the top of the base, and a second nut 89 interposed between the spacer means and the heater assembly is employed to coact with the spring washer 67 in clamping the elements of the heater assembly together.

In this case also the resistance element 76 is in the form of a flat washer encircling an insulating tube 90 on the upper end portion of the bolt, confined between the spring washer 67 and the nut 89. It has upper and lower terminals provided with flat body portions 30' and 29', respectively, between which it is clamped, but in this case the terminal portions 91 of these terminals project outwardly from the peripheries of the body portions in the plane thereof toward opposite longitudinal edges of the base as shown in Figure 11.

The insulating washer 70 which lies beneath the body portion 29' of the lower terminal for the resistance element is substantially thin in this case so as to not interfere appreciably with the heating of the bimetallic blade 21" by the resistance element 76. The blade 21" in this case is perfectly flat and has a central aperture (not shown) to receive the insulating sleeve 90 on the mounting bolt 65', and its mounted end portion overlies one of the terminal members 71' of the switch. The terminal portion 74' of the terminal member 71' is formed integrally with and extends straight rearwardly from the body portion of the terminal member, toward the rear of the base.

The stationary contact 46 is mounted on a rearward horizontal extension 93 of one upright leg 94 of a substantially U-shaped sheet metal stamping 95. The bight portion 96 of this stamping flatwise overlies the base 26 and is riveted thereto as at 97. The other upright leg 98 of the stamping serves as the other terminal for the thermal switch.

The stationary contact 46, of course, is located directly beneath the movable contact 47 on the free end portion of the bimetallic blade 21", and in this case there is no overcenter spring mechanism to effect snap actuation of the switch between its open and closed positions. The bimetallic blade is flexed downwardly to carry its movable contact 47 into engagement with the stationary contact 46 upon heating of the blade by the resistance element 76, and the blade flexes upwardly upon cooling to effect opening of the switch.

From the foregoing description taken together with the accompanying drawings, it will be readily apparent to those skilled in the art that this invention provides an exceptionally small and compact but highly efficient control device which is especially useful when employed with radio and television receivers to prolong the lives of the thermionic tubes of such receivers.

What is claimed as our invention is:

1. In an electric circuit controlling device of the character described: a base of insulating material having substantially flat upper and lower faces; a thermal switch comprising a bimetallic blade flatwise overlying the upper face of the base, said blade having one end fixed with respect to the base and having a free end portion spaced above and flexible toward and from the base, and a stationary contact fixed to the base beneath the free end of the blade to be engaged thereby as a consequence of flexure of the blade toward the base upon heating of the blade to a predetermined value; switch terminals connected to the fixed end of the blade and to said stationary contact to provide for connection of the switch in a circuit to be controlled; a disc-like resistance element providing an electric heater for the bimetallic blade; a pair of terminal members for connecting the resistance element in a heating circuit, said terminal members having opposing body portions between which the disc-like resistance element is flatwise confined; and common means mounting said disc-like resistance element on the base in a position overlying but spaced from the bimetallic blade, and for maintaining the resistance element tightly clamped between the body portions of its terminal members, comprising a pair of flanges on each terminal member projecting downwardly from the body portion thereof toward the base and abutting the upper face thereof, the flanges on each terminal member straddling the bimetallic blade and being spaced therefrom and from the flanges of the other terminal member, and tongues projecting downwardly from the outermost flanges and gripping the base.

2. The electric circuit controlling device of claim 1 further characterized by the provision of overcenter spring means reacting between a part on the base and the free end of the bimetallic blade to effect snap actuation of the blade between switch open and switch closed positions.

3. The electric circuit controlling device of claim 1 wherein said disc-like resistance element has a negative temperature coefficient of resistance whereby the electrical resistance of the element decreases as its temperature increases.

4. The electric circuit controlling device of claim 1 wherein the body portion of one of said terminal members for the resistance element is interposed between the disc-like resistance element and the bimetallic blade and has a portion thereof cut out to facilitate heat transfer between the resistance element and the blade.

5. The electric circuit controlling device of claim 1 wherein the body portion of one of said terminal members for the resistance element has its medial portion stepped and spaced from the adjacent face of the resistance element to embrace the bimetallic blade.

6. The electric circuit controlling device of claim 1 further characterized by the provision of a spring seat member fixed to the upper face of the base adjacent to the stationary contact thereof; and by the provision of an overcenter spring confined under compression between said spring seat member and the free end of the bimetallic blade to effect snap actuation of the blade between switch open and switch closed positions.

7. The electric circuit controlling device of claim 6 further characterized by the provision of a bridge piece formed integrally with the spring seat member and extending over the free end portion of the bimetallic blade to limit upward switch opening motion thereof.

8. The electric circuit controlling device of claim 1 wherein said switch terminals project downwardly beyond the lower face of the base; and further characterized by the provision of terminal portions on said terminal members for the resistance element, said terminal portions being integral with one of the flanges on each terminal member and likewise projecting downwardly beyond the lower face of the base.

9. An overcenter snap switch of the type wherein a spring is connected to and confined under compression between the free end of a flexible blade and a fulcrum opposite the free end of the blade so that back and forth flexure of the free end of the blade in directions substantially normal to its opposite faces causes the spring to rock about the axis of its fulcrum to and beyond a dead center position at which the direction of the force exerted on the blade by the spring suddenly reverses and the spring snaps the blade in one direction or the other, characterized by: the fact that the spring is made from a length of wire having its opposite end portions bent to provide a pair of legs which are journaled on and engage the fulcrum at areas spaced from one another along the axis of the fulcrum; by the fact that the medial portion of the wire is bent to provide a tongue which is centered with respect to said legs and is loosely operatively connected with the blade; and by the fact that all portions of the spring lie in a common plane.

10. The overcenter snap switch of claim 9, further characterized by: the fact that the blade has a leg thereon bent up from its free end portion and provided with a slit in which the tongue on the spring is received; and by the fact that the fulcrum is provided by a V-shaped groove in a stationary spring seat member.

11. The circuit controlling device of claim 12, further characterized by the fact that said means providing the fulcrum is adjustable to move its blade engaging part toward or from the resistance element.

12. An electric circuit controlling device comprising: a base of insulating material; a pair of switch terminals fixed to the base, said terminals having spaced apart contact portions; a flat disc-like resistance element; terminal members for said resistance element each having a part thereof engaging one face of the resistance element; means mounting said terminal members on the base and by such mounting clamping the resistance element between the element-engaging parts of the terminal members and positioning the resistance element in overlying spaced relation to the portion of the base between said spaced apart contact portions of the switch terminals; a thermally deformable bridging member having portions thereof adjacent to the contact portions so that said bridging member may electrically bridge the same; means mounting the bridging member in the space between the resistance element and the adjacent portion of the base, in a position to electrically bridge said contact portions and close the switch upon flexure of the bridging member with respect to the resistance element and the base in response to a temperature change caused by current flowing through said resistance element; and means on the base and engaging the thermally deformable bridging member at a location intermediate the portions thereof which are adjacent to said contact portions of the switch terminals to provide a fulcrum against which the thermally deformable bridging member bears in its switch closing flexure.

13. An electric circuit controlling device comprising: a base of insulating material having a substantially flat face; a pair of switch terminals fixed to spaced apart portions of the base, said terminals having contact portions exposed at said substantially flat face of the base and spaced from one another along said base; a disc-like resistance element flatwise overlying and spaced from a portion of the substantially flat face of the base which lies between said contact portions; a first terminal member for the resistance element having a part thereof engaging the side of the resistance element nearest the base; spaced apart support means for the first terminal member, said support means being fixed with respect to the base and projecting from said face thereof at locations spaced from one another and adjacent to substantially diametrically opposite portions of the resistance element, said support means rigidly supporting the element engaging part of the first terminal member in substantially parallel closely spaced relation to said face of the base to thereby accurately locate the resistance element with respect to the face of the base; a second terminal member for the resistance element having a part thereof engaging the opposite side of the resistance element; means rigidly connecting said second terminal member with the base at locations thereof spaced from one another and disposed in substantially diametrically opposite relation with respect to the resistance element, with its element-engaging part bearing firmly against the resistance element to press the same against the element-engaging part of the first terminal member; a thermally deformable bridging member to electrically bridge the contact portions of the switch terminals; and means supporting the bridging member from the base with the bridging member overlying said face of the base and in the space between the element-engaging part of the first terminal member and said face of the base, in spaced relation to both, and with spaced apart portions of the bridging member in juxtaposition to said contact portions to electrically bridge the same upon flexure of the bridging member with respect to the base and in response to a temperature change caused by current flowing through the resistance element.

References Cited in the file of this patent

UNITED STATES PATENTS

| | | |
|---|---|---|
| 1,597,719 | Burnham | Aug. 31, 1926 |
| 1,898,174 | Dubilier | Feb. 21, 1933 |
| 1,960,408 | Brach | May 29, 1934 |
| 2,122,986 | Mason | July 5, 1938 |
| 2,336,504 | Ruben | Dec. 14, 1943 |
| 2,343,132 | Barr | Feb. 29, 1944 |
| 2,347,222 | Sitzer | Apr. 25, 1944 |
| 2,499,208 | Zimmer | Feb. 28, 1950 |
| 2,740,012 | Lautzenhiser | Mar. 27, 1956 |
| 2,756,382 | Wuerth | July 24, 1956 |
| 2,840,760 | Torrence | June 24, 1958 |
| 2,852,640 | De Lancey | Sept. 16, 1958 |

FOREIGN PATENTS

| | | |
|---|---|---|
| 1,197 | Australia | Mar. 16, 1931 |
| 686,865 | France | Apr. 22, 1930 |